United States Patent [19]
Kohno et al.

[11] Patent Number: 5,829,479
[45] Date of Patent: Nov. 3, 1998

[54] ROTARY VALVE

[75] Inventors: Yasushi Kohno; Yoichi Ido, both of Susono, Japan

[73] Assignee: Yazaki Corporation, Tokyo, Japan

[21] Appl. No.: 795,286

[22] Filed: Feb. 4, 1997

Related U.S. Application Data

[63] Continuation of Ser. No. 493,416, Jun. 22, 1995, abandoned.

[30] Foreign Application Priority Data

Jul. 4, 1994 [JP] Japan .................................. 6-152067

[51] Int. Cl.⁶ .................................................. F16L 17/00
[52] U.S. Cl. ........................................ 137/580; 285/121.5
[58] Field of Search ........................ 137/580; 285/121.3, 285/121.5

[56] References Cited

U.S. PATENT DOCUMENTS

| | | |
|---|---|---|
| 4,683,912 | 8/1987 | Dubrosky ................................. 137/580 |
| 4,804,027 | 2/1989 | Runels ................................. 137/580 X |
| 4,921,010 | 5/1990 | Spirer ...................................... 137/580 |

FOREIGN PATENT DOCUMENTS

1204772  1/1960  France ................................... 137/580
1-165893  11/1989  Japan .

*Primary Examiner*—John Fox
*Attorney, Agent, or Firm*—Armstrong, Westerman, Hattori, McLeland & Naughton

[57] ABSTRACT

A rotary valve of a multi-circuit type consists of an outer valve body with a cylindrical hole therethrough and an inner valve body rotatably inserted into the cylindrical hole of the outer valve body. The outer valve body is at a plurality of heights provided with outer fluid lines extending through the wall of the outer valve body to the cylindrical hole, and with fittings on its outer surface that connect to the outer fluid lines. The inner valve body has on its outer periphery annular passages made fluid-tight and communicated with respective outer fluid lines of the outer valve body when the inner valve body is inserted into the outer valve body. The inner valve body further has inner fluid lines that communicate one of the annular passages with a respective one of the fittings mounted around the flange of the inner valve body. To one or the other of the fittings on the outer and inner valve bodies are connected pipeways on the fluid inlet side or pipeways on the fluid outlet side. The multi-circuit type rotary valve is compact in size and excludes entanglements to its outer piping.

3 Claims, 7 Drawing Sheets

PRIOR ART

ROTARY VALVE

This application is a continuation of application Ser. No. 08/493,416 filed Jun. 22, 1995, now abandoned.

BACKGROUND OF THE INVENTION

1. Field of the Invention

This invention relates to a rotary valve of a multi-circuit type which relays to supply air or other fluid from a plurality of inlet pipeways to their respective outlet pipeways.

2. Description of the Related Art

An example of a multi-circuit type rotary valve is shown in Japanese Utility Model Application Laid-Open Specification No. Hei 1-165893.

Figure 11:
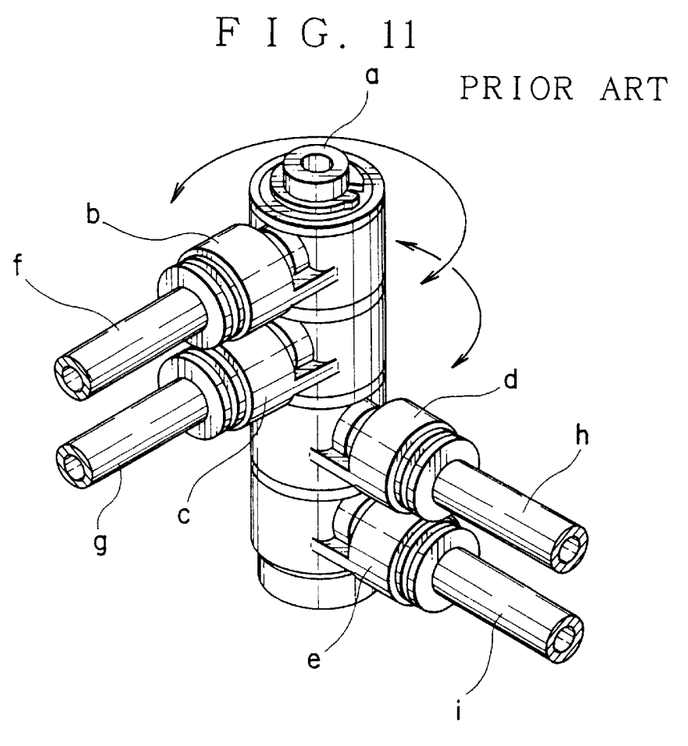
FIG. 11 is a perspective view of a conventional rotary valve.

This multi-circuit type rotary valve, as shown in a perspective view in FIG. 11, has fittings b, c rotatable centering around a central line portion a and fixed fittings d, e incapable of rotating. To the rotatable fittings b, c are respectively connected tubes f, g, and to the fixed fittings d, e are respectively connected tubes h, i.

The fluid in the tube i flows through the fixed fitting e, a central passageway (not shown) extended along the center axis of the central line portion a, and the rotatable fitting b to the tube f. The fluid in the tube h flows through the fixed fitting d, a peripheral passageway (not shown) around the central line portion a, and the rotatable fitting c to the tube g.

Thus, it is possible to allow the fluids to pass through the two circuits independently from each other in selected directions.

This multi-circuit type rotary valve, however, has the following drawbacks.

(1) Rotation of the rotatable fittings b, c in certain directions causes entanglements to their tubes f, g.

(2) A pair of rotatable fitting and fixed fitting is required for each circuit of fluid. To avoid interference during rotation between neighboring rotatable fittings, a large space is required between them. This gives rise to a problem that the multi-circuit type rotary valve becomes large in length.

(3) The rotary valve is not applicable to such cases where one line is distributed into a plurality of lines, and where a plurality of types of fluid such as fluids under positive and negative pressures are required to be passed.

SUMMARY OF THE INVENTION

This invention has been accomplished to overcome the above drawbacks and one of its objects is to provide a rotary valve applicable to the case where a multiplicity of circuits of fluid are required and causing no entanglements to its piping.

In order to attain the object, according to this invention, there is provided a rotary valve comprising: an outer valve body with a cylindrical hole therethrough, which has outer fluid lines formed at respective positions longitudinally different from each other, each outer fluid line extending from an outer surface of the outer valve body to the cylindrical hole, and fittings fixed to the outer surface of the outer valve body so as to be connected to the outer fluid lines; and an inner valve body with an outer periphery rotatably inserted into the cylindrical hole of the outer valve body and provided at one end with a flange radially outwardly extending beyond the outer periphery of the inner valve body, the inner valve body having on the outer periphery longitudinally-spaced annular passages each made fluid-tight and communicated with a respective one of the outer fluid lines when the inner valve body is inserted into the outer valve body, fittings fixed to an outer surface of the flange, and inner fluid lines each communicating one of the annular passages with a corresponding one of the fittings on the outer surface of the flange; wherein one or the other of the fittings on the outer valve body and the fittings on the inner valve body are connected to pipeways on a fluid inlet side or to pipeways on a fluid outlet side.

In the thus constructed rotary valve, the fittings on the flange of the inner valve body communicate through their respective inner fluid lines to related annular passages, and to related outer fluid lines in the outer valve body connected to the annular passages.

Thus, the pipeways connected to the fittings on the inner valve body communicate to their respective pipeways connected to the fittings on the outer valve body.

The inner valve body and the pipeways connected thereto are fixed to a rotary table to be rotated. Thus, when the inner valve body is rotated, the pipeways connected to the fittings of the inner valve body are also rotated along with the inner valve body, thereby causing no entanglements.

In this case, the outer valve body is made fixed, and no entanglements are caused to the pipeways connected to the fittings of the outer valve body, either.

Alternatively, the inner valve body may be fixed, with the outer valve body and the pipeways connected to the fittings on the outer valve body rotated as a unit.

Since a multiplicity of inner fluid lines may be provided in the inner valve body, the rotary valve is adaptable to a multi-circuit rotary valve in which a plurality of types of fluid such as fluids under positive and negative pressures are passed.

Further, by communicating a plurality of inner fluid lines with each other and substituting a blind stopper or stoppers for part of the fittings, a rotary valve is provided in which one line is distributed into a plurality of lines.

The above and other objects, features and advantages of this invention will become apparent from the following description and the appended claims, taken in conjunction with the accompanying drawings in which like parts or elements are denoted by like reference characters.

DESCRIPTION OF THE PREFERRED EMBODIMENT

Figure 1:
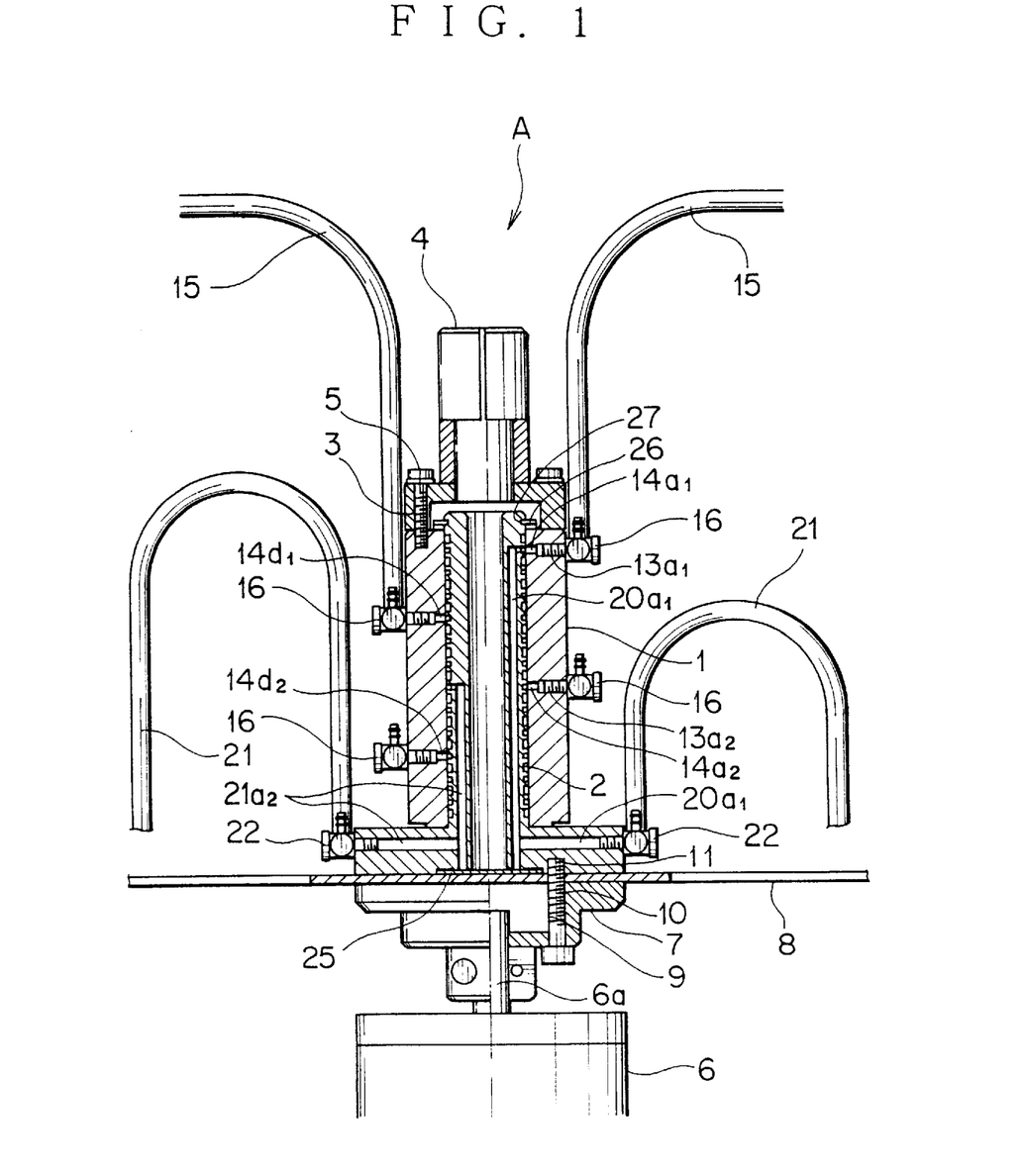
FIG. 1 is a longitudinal sectional view of a rotary valve according to one embodiment of this invention.

FIG. 1 is a longitudinal sectional view of a rotary valve A according to one embodiment of this invention. The rotary valve A has a cylindrical outer valve body 1 and an inner valve body 2 rotatably inserted in the cylindrical outer valve body 1.

The outer valve body 1 is on its upper end surface provided with a threaded hole 3 into which a screw 5 is screwed to secure an upper support 4 thereto. The upper support 4 is for securing the outer valve body 1 to a fluid pressure source (air source in the present embodiment).

The inner valve body 2 is fixed to the top of a table 8, which in turn is fixed to an output shaft 6a of a motor 6 via a table center 7. In other words, a bolt 10 is inserted through a bolt-insertion hole 9 in the table center 7 and through the rotary table 8 so that its front end is screwed into a threaded hole 11 in the underside of the inner valve body 2.

Thus, on rotation of the output shaft 6a of the motor 6, the rotary table 8 and the inner valve body 2 thereon rotate as an integral unit.

Figure 2:
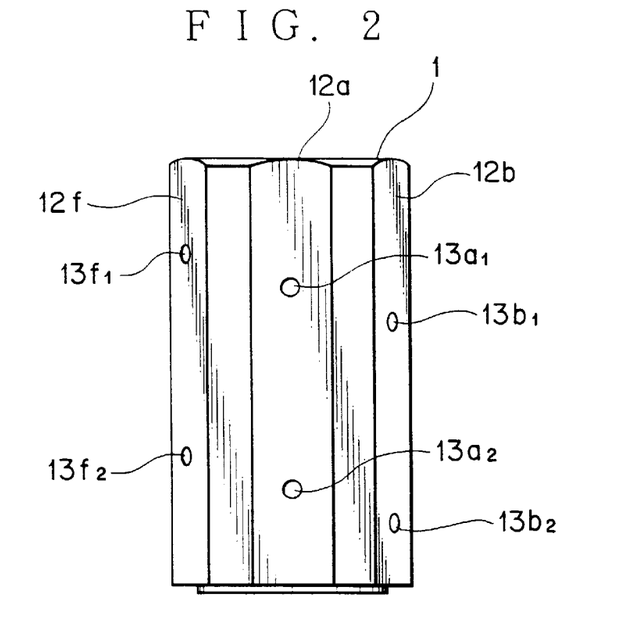
FIG. 2 is a front view of an outer valve body used in the rotary valve of FIG. 1.
Figure 3:
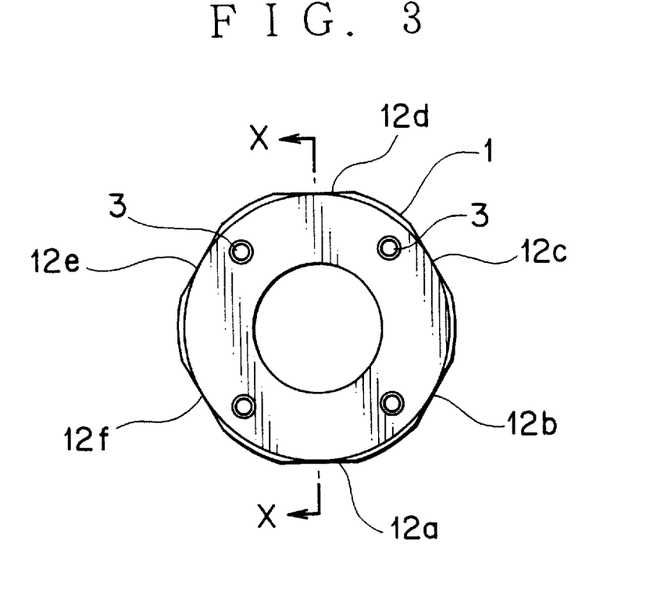
FIG. 3 is a plan view of the outer valve body.

The outer valve body 1 is on its outer periphery at six angularly equally spaced positions provided with fitting-mounting seats 12a to 12f, each flatly extended longitudinally, as shown in FIGS. 2 and 3. Threaded holes 13a1 and 13a2 are provided at two vertically spaced positions on the fitting-mounting seat 12a, and outer fluid lines 14a1 and 14a2 are provided so as to respectively extend from the threaded holes 13a1 and 13a2 to a cylindrical hole of the outer valve body 1.

Likewise, the fitting-mounting seats 12b to 12f are respectively provided with two threaded holes 13b1, 13b2 to 13f1, 13f2 and with outer fluid lines 14b1, 14b2 to 14f1, 14f2 that communicate the threaded holes 13b1, 13b2 to 13f1, 13f2 with the cylindrical hole of the outer valve body 1.

Figure 4:
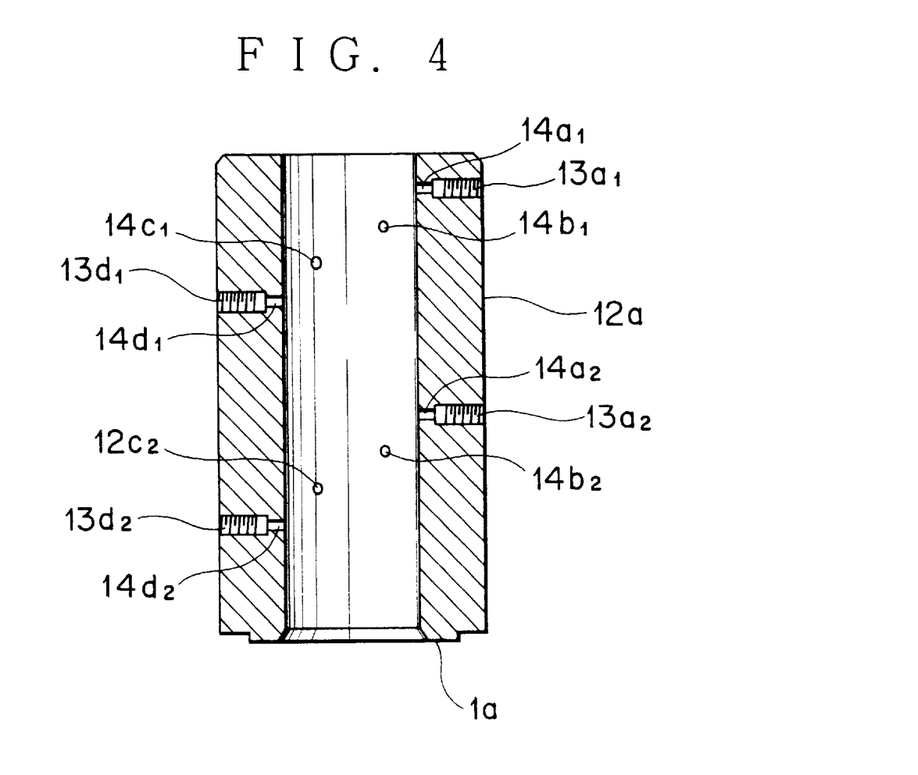
FIG. 4 is a sectional view taken along the line X—X of FIG. 3.

The heights from the bottom surface 1a (see FIG. 4) where the outer fluid lines 14a1, 14a2 to 14f1, 14f2 are located, all differ from each other.

Into each of the threaded holes 13a1, 13a2 to 13f1, 13f2 is screwed a fitting 16 which connects to a pipeway 15 on the fluid inlet side (see FIG. 1).

Figure 6:
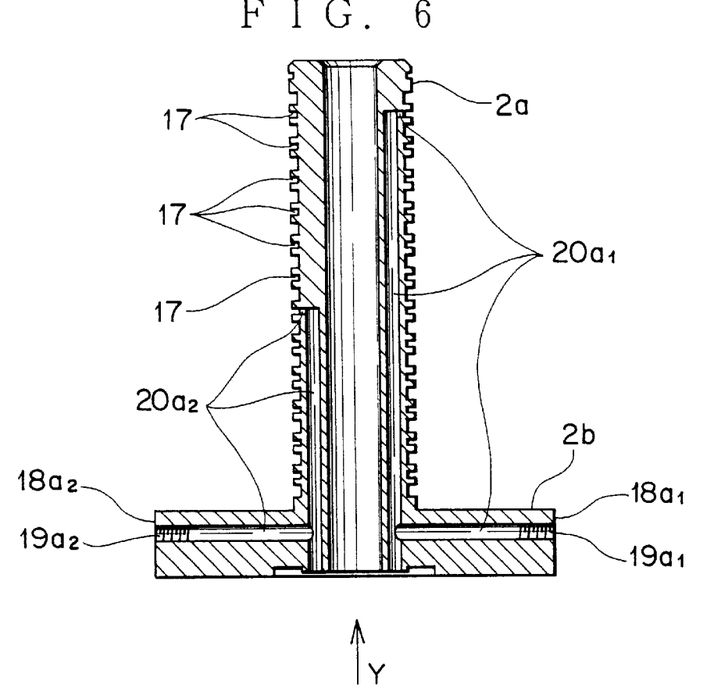
FIG. 6 is a longitudinal sectional view of the inner valve body.

The inner valve body 2, which is rotatably inserted into the outer valve body 1, has an outer periphery 2a and at the lower end a flange 2b that radially outwardly extends beyond the outer periphery 2a. As shown in FIG. 6, on the outer periphery 2a at heights corresponding to the respective outer fluid lines 14a1, 14a2 to 14f1, 14f2 of the outer valve body 1 are circumferentially provided annular passages 17.

Figure 7:
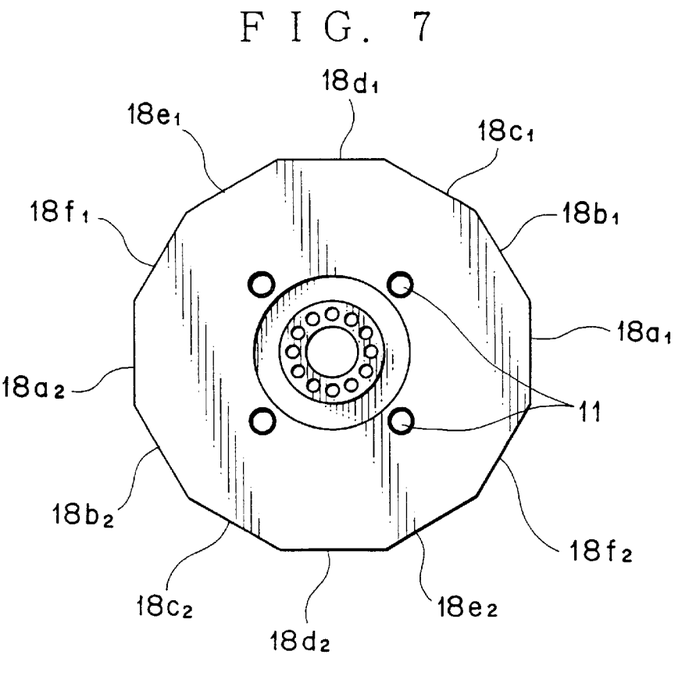
FIG. 7 is a bottom view of the inner valve body, viewed in the direction of Y of FIG. 6.

The flange 2b, as shown in FIG. 7, has a dodecagonal shape in section with twelve flat surfaces 18a1 to 18f1, 18a2 to 18f2.

Figure 5:
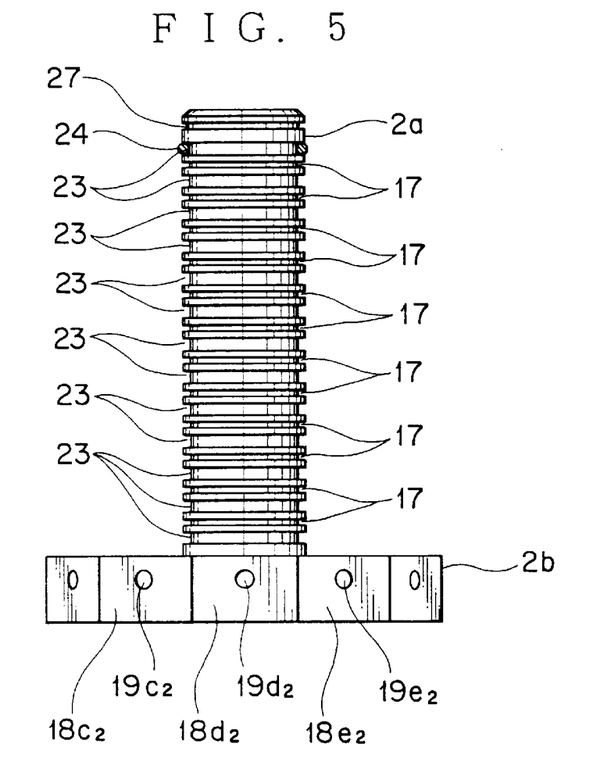
FIG. 5 is a front view of an inner valve body used in the rotary valve of FIG. 1.

On the twelve flat surfaces 18a1 to 18f1, 18a2 to 18f2 are respectively provided threaded holes 19a1 to 19f1, 19a2 to 19f2 (see FIGS. 5 and 6).

Longitudinal holes each extending from the bottom surface of the flange 2b of the inner valve body 2 to the height of a respective annular passage 17, radial holes each communicating the upper end of one of the longitudinal holes with a corresponding annular passage 17, and radial holes each communicating the lower end of one of the longitudinal holes with a corresponding one of the threaded holes l9a1 to 19f1, 19a2 to 19f2 cooperate with each other to constitute inner channels 20a1 to 20f1, 20a2 to 20f2 (20a1 and 20a2 are shown in FIG. 6).

The lower end of the above-mentioned longitudinal holes is closed by means of a packing 25 interposed between the bottom surface of the flange 2b of the inner valve body 2 and the rotary table 8.

Thus, the threaded hole 13a1 in the outer valve body 1 communicates through the outer fluid line 14a1, the related annular passage 17 on the inner valve body 2 and the inner fluid line 20a1 to the threaded hole 19a1. The threaded hole 13a2 communicates through the outer fluid line 14a2, the related annular passage 17 on the inner valve body 2 and the inner fluid line 20a2 to the threaded hole 19a2.

Likewise, threaded holes 13b1, 13b2 to 13f1, 13f2 communicate with threaded holes 19b1, 19b2 to 19f1, 19f2, respectively.

Into each of the threaded holes 19a1, 19a2 to 19f1, 19f2 is screwed a fitting 22 which connects to a pipeway 21 on the outlet side (see FIG. 1).

The annular passages 17 are alternated with annular sealing member fitting grooves 23, in each of which a sealing member 24 such as an O-ring is fitted (see FIG. 5). The sealing members 24 closely contact the inner periphery of the outer valve body 1 with elastic deformation so that neighboring sealing members 24 exclude leakage of the fluid from the annular recess 17 therebetween.

Where an O-ring is employed as the sealing member 24, the rate of elastic deformation of 5% or less is likely to cause leakage, while 20% or more causes an increase in the torque of rotation of the inner valve body 2. It is therefore preferred that the rate of elastic deformation be in the range of about 5 to 20%.

The inner valve body 2 is on the outer periphery 2a at the upper end provided with a groove 27 for fitting a retaining ring 26.

The operation of the thus constructed rotary valve A will now be described.

The outer valve body 1 is secured to an air supply source (not shown) by means of the upper support 4, and the inner valve body 2 and the pipeway 21 on the outlet side are secured to the rotary table 8.

Thus, entanglements or twists are not caused to the pipeway 15 on the inlet side nor to the pipeway 21 on the outlet side on rotation of the inner valve body 2.

The fittings 16 are fitted in longitudinal and circumferential arrangements on the outer periphery of the outer valve body 1, and the fittings 22 are fitted circumferentially around the outer periphery of the flange 2b of the inner valve body 2, leading to the compactness of the multi-circuit air valve A.

When air is supplied from the air supply source while the rotary table 8 and thus the inner valve body 2 are rotated by a motor 6, the air passes through the pipeways 15 on the fluid inlet side, the fittings 16, outer fluid lines 14a1 to 14f2 to the annular passages 17 on the inner valve body 2, and then through the inner fluid lines 20a1 to 20f2 to the fittings 22 and to the pipeways 21 on the outlet side.

While in the above example, the inlet-side pipeways 15 are shown to be connected to the outer valve body 1, and the outlet-side pipeways 21 to the inner valve body 2, it is also possible to use the pipeways 21 as inlet-side ones and the pipeways 15 as outlet-side ones.

While in the above example, the outer valve body 1 is shown to be fixed, and the inner valve body 2 to be rotated, it is also possible to arrange so that the inner valve body 2 is fixed and the outer valve body 1 is rotated.

Further, a fluid other than air is also usable.

Figure 8:
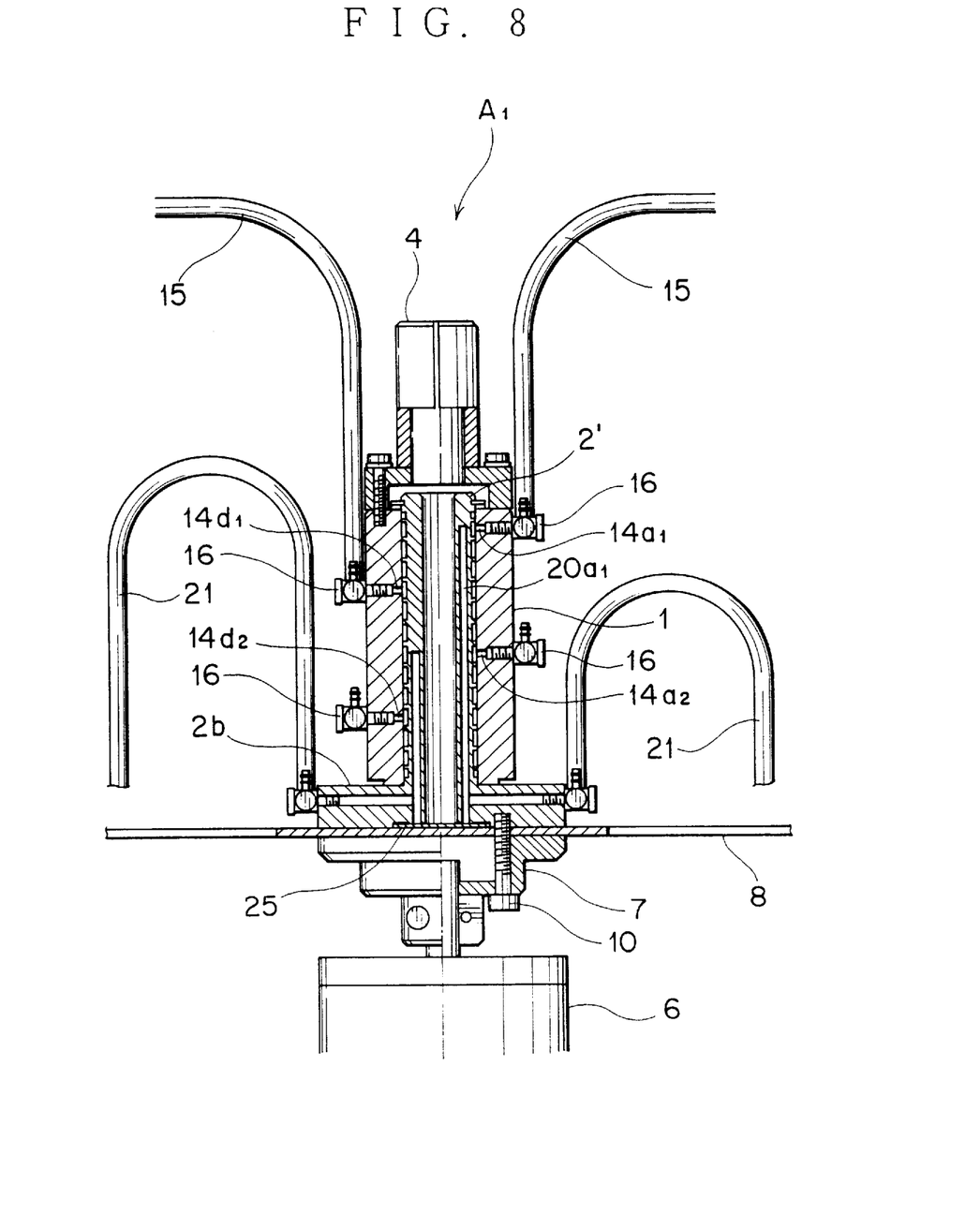
FIG. 8 is a longitudinal sectional view of a rotary valve according to another embodiment of this invention.
Figure 9:
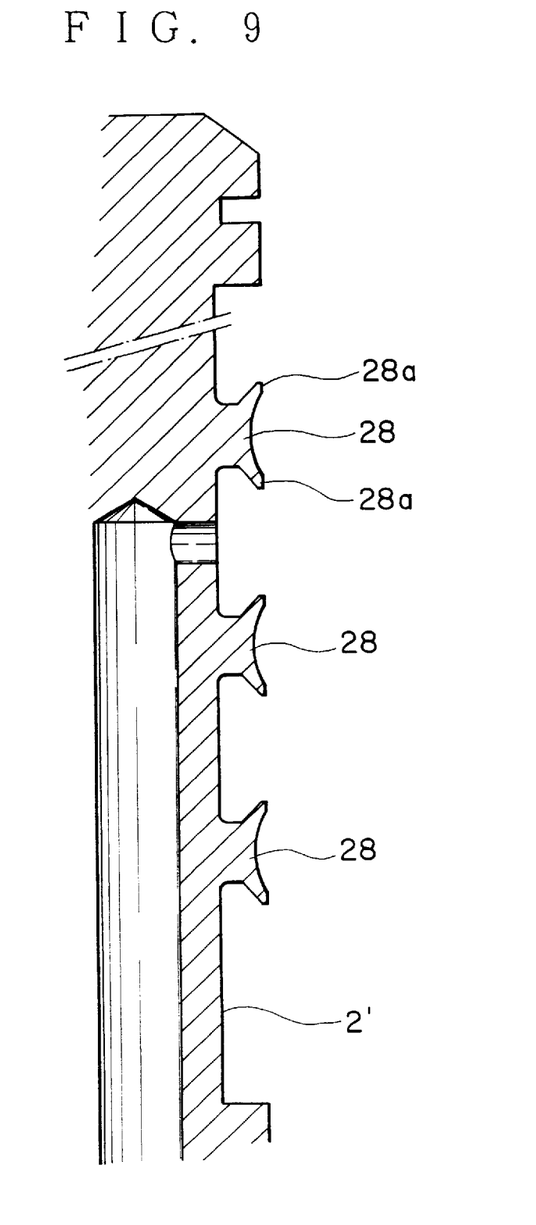
FIG. 9 is a longitudinal sectional view of an essential portion of an inner valve body according to the embodiment of FIG. 8.

FIG. 8 is a longitudinal sectional view of a rotary valve A1 according to another embodiment of this invention, and FIG. 9 is a longitudinal sectional view of an essential portion of an inner valve body 2' used in the rotary valve A1.

The rotary valve A1 is identical in structure with the rotary valve A according to the afore-described embodiment, except that the inner valve body 2' is on its outer periphery provided with annular elastic projections 28 instead of the fitting grooves 23 and the sealing members 24 fitted therein. The elastic projections 28 are spaced from each other in a longitudinal direction of the inner valve body 2' so that two neighboring elastic projections 28 define an annular passage 17 therebetween when the inner valve body 2' is rotatably inserted into the outer valve body 1.

As shown in FIG. 9, each elastic projection 28 is at the front end provided with a pair of lips 28a which generally diverge upwardly and downwardly, and which undergo elastic deformation on closely contacting the inner periphery of the outer valve body 1 to seal annular passages 17 therebetween. Thus, leakage of air from annular passages 17 is prevented.

Figure 10:
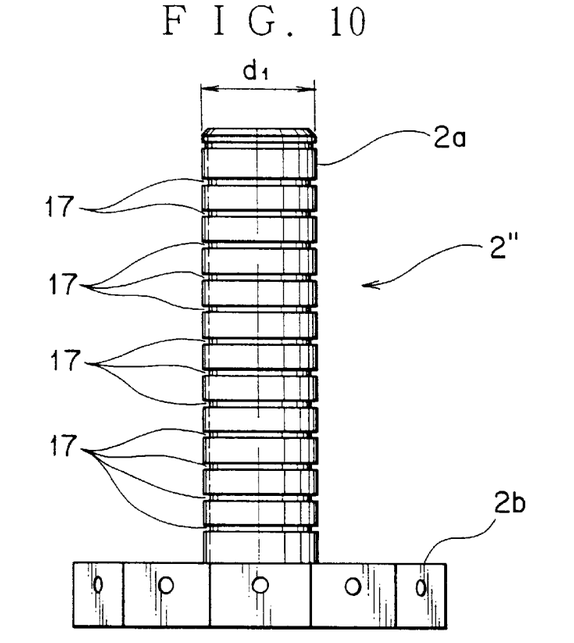
FIG. 10 is a front view of a further modified inner valve body used in the rotary valve according to this invention.

FIG. 10 is a front view of an inner valve body 2" used in a rotary valve according to yet another embodiment of this invention.

Instead of being provided with sealing member-fitting grooves 23 or elastic projections 28 as in the preceding embodiments, the inner valve body 2" has an outer periphery the diameter d1 of which is of such size as to provide air tightness relative to the inner diameter of the outer valve body 1 while allowing rotation of the inserted inner valve body 2". In this case, annular passages 17 are provided in the form of grooves on the outer periphery of the inner valve body 2", longitudinally spaced from each other.

Preferably, the sizes of the tight fit are in the range of about hole H6, shaft g5 to hole H9, shaft g9 when expressed in terms of fit designations according to the Japanese Industrial Standard.

With the construction as described above, this invention provides such advantages as mentioned below.

(1) The rotary valve according to this invention, which is mainly composed of an outer valve body and an inner valve body, requires a small number of constituent parts and is of a simple structure.

Further, since a multiplicity of fittings may be collectively fitted around the outer peripheries of the outer and inner valve bodies, a rotary valve with a multiplicity of circuits may be provided in a compact form, thus leading to a decrease in the space required for the installation of a rotary valve.

(2) Through fixation of the outer valve body and its piping and fixation of the inner valve body and its piping to the rotary table, there will be no entanglements between the inlet-side piping and the outlet-side piping.

The same also applies when the inner valve body is fixed and the outer valve body is rotated.

(3) Since a multiplicity of inner fluid lines are provided in a close arrangement in the inner valve body, a modification is possible in which one line is distributed to a plurality of lines, leading to easy adaptation to a rotary valve with branch circuits.

Further, with a multiplicity of circuits provided, the rotary is applicable to the case where a plurality of types of fluid such as fluids under positive and negative pressures are required.

What is claimed is:

1. A rotary valve comprising:

an outer valve body with a cylindrical hole therethrough, which has a plurality of longitudinally equally spaced outer fluid lines formed at circumferentially regular intervals, each outer fluid line extending from an outer surface of said outer valve body to said cylindrical hole, and fittings fixed to said outer surface of said outer valve body so as to be connected to said outer fluid lines;

an inner valve body with on its cylindrical outer periphery a plurality of annular projections each having same diameter, said inner valve body being rotatably inserted into said cylindrical hole of said outer valve body and provided at one end with a flange radially outwardly extending beyond said outer periphery of said inner valve body, said inner valve body having on said outer periphery a plurality of longitudinally spaced annular grooves formed by said adjacent annular projections, wherein said annular grooves are constituting annular passages alternating with annular fitting grooves, said each annular passage made fluid-tight and communicated with a respective one of said outer fluid lines when said inner valve body is inserted into said outer valve body;

annular sealing members fitted into said annular fitting grooves and making said annular passages fluid-tight when said inner valve body is inserted into said outer valve body, wherein said annular sealing members function as bearings;

fittings fixed to an outer surface of said flange; and inner fluid lines each communicating one of said annular passages with a corresponding one of said fittings on said outer surface of said flange;

wherein one or the other of said fittings on said outer valve body and said fittings on said outer surface of said flange are connected to pipeways on a fluid inlet side or to pipeways on a fluid outlet side;

wherein said outer and inner valve bodies are integral pieces;

wherein said inner valve body is rotatable mounted in said outer valve body by way of and supported only by said annular sealing members;

and wherein the rate of elastic deformation of said annular sealing members falls in the range of about 5 to 20%.

2. The rotary valve according to claim 1, wherein said fittings on said outer valve body are connected to said pipeways on said fluid inlet side, and said fittings on said inner valve body are connected to said pipeways on said fluid outlet side.

3. The rotary valve according to claim 1, wherein said annular fitting grooves amount in total to substantially ½ or more of a height of said cylindrical outer periphery of said inner valve body such that said sealing members fitted into said annular fitting grooves rotatably support said inner valve body in said outer valve body without using bearings.

* * * * *